July 18, 1961 F. G. STEELE 2,993,161

WAVE RECORDING APPARATUS

Original Filed Nov. 5, 1948

INVENTOR:
FLOYD G. STEELE

By Herbert E. Metcalf

HIS PATENT ATTORNEY

United States Patent Office 2,993,161

Patented July 18, 1961

2,993,161

WAVE RECORDING APPARATUS

Floyd G. Steele, Long Beach, Calif., assignor to Northrop Corporation, a corporation of California Original application Nov. 5, 1948, Ser. No. 58,493. Divided and this application Apr. 1, 1952, Ser. No. 280,061

1 Claim. (Cl. 321—63)

This invention relates to signal recording apparatus and more particularly, to apparatus for the accurate reproduction of a periodic wave train on a recording medium.

Precision recording is of especial importance in the field of electronic computers as in the establishment of time signals, for example. Such time signals are usually permanently recorded on a unique area of the recording medium. Furthermore, it is often desirable to store information in the form of electrical pulses, for example, for various time intervals and also to effect alteration or erasure of such information, if so desired. By recording electrical signals on a magnetizable area on a rotatable disc, for example, a compact and efficient information storage system is provided.

It is, accordingly, an object of this invention to provide means for the efficient and accurate reproduction of a desired signal track.

It is another object of this invention to provide means for recording a relatively high frequency signal by sensing a basic relatively low frequency reference signal.

Briefly, the invention comprises a reference signal source, as a master gear, for example, and signal sensing means associated therewith. The signal sensing means is connected to a recording device via appropriate circuitry as a frequency multiplier, for example. The recording device conveys a responsive signal to a recording medium—a disc coated with a magnetizable substance and driven by a constant speed power source, for example. Thus a fast, accurate means of signal reproduction is provided.

This application is a division of my prior application Serial No. 58,493, filed November 5, 1948, now withheld from issue, which discloses a means and method of angle measurement or linear measurement wherein the present invention has particular utility. The nature of the apparatus shown therein in detail was such as to require a circular or other closed track with a great number of accurately spaced and complete cycles of a constant frequency, e.g., exactly 10,000 cycles per revolution of the track, to act as a very accurately performing signal generator. Further, the resulting signal track thus provided had to be exactly closed to form an endless uninterrupted undistorted waveform having every cycle thereof exactly equal.

Figure 1:
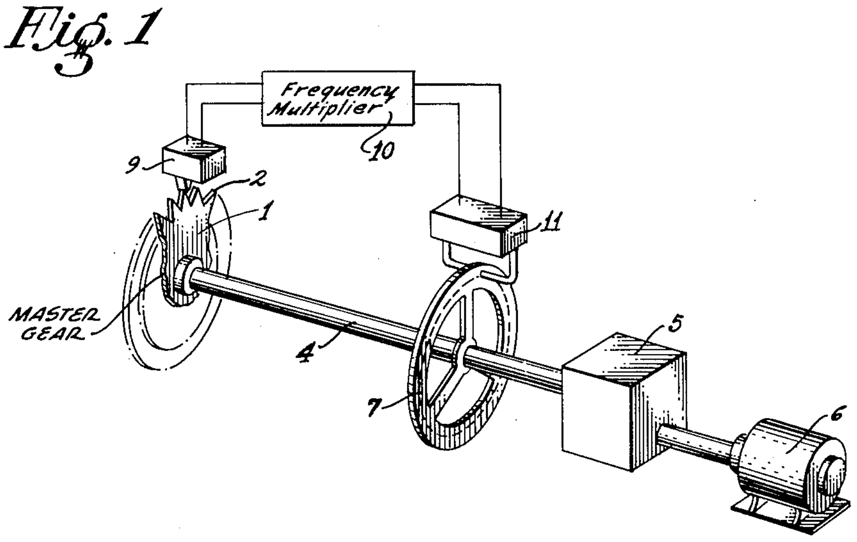
FIGURE 1 shows one method of recording the frequency track.

One way of recording an accurately closed track is shown in FIGURE 1. An accurately cut master gear 1 with relatively few teeth 2 of magnetic material thereon is rotated by shaft 4 driven through gear box 5 by a constant speed motor 6. A record disc 7 is also rotated by shaft 4. A master gear magnetic pickup 9 is positioned to be magnetically influenced by rotation of teeth 2 to form a signal frequency corresponding to gear rotation and number of teeth thereon, as is well known in the art. The gear frequency is then passed through a frequency multiplier 10 and the multiplied frequency magnetically recorded by recording head 11 on record disc 7. Record disc 7 can then be used if desired in place of gear 1 and a still higher frequency recorded on a second record disc. In either case, once one accurately closed track has been obtained, it can, when used as a master record, be utilized to record closed tracks on other discs turned with it, and these other discs can be of any size.

Figure 2:
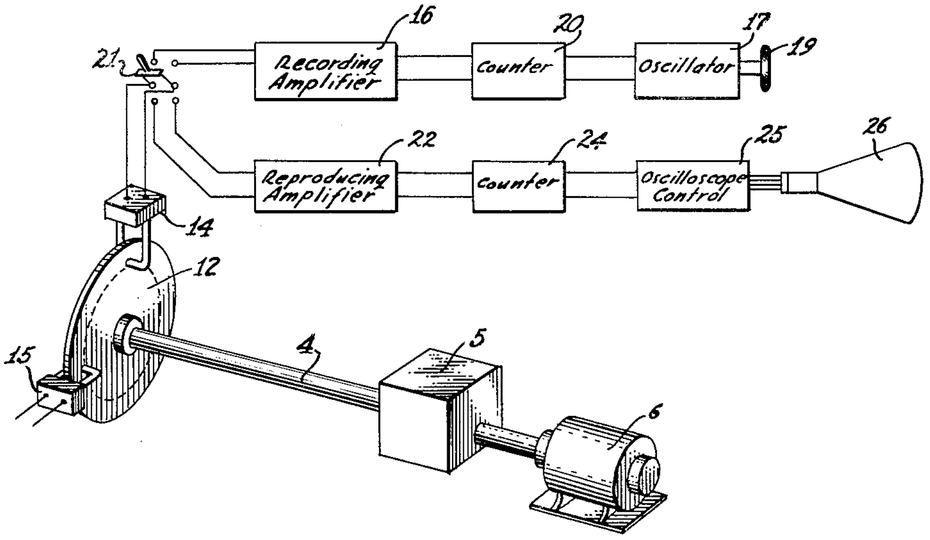
FIGURE 2 shows another method of recording the frequency track.

Another way of recording a closed track without making accurate master gear 1 is to record the track by trial and error directly on a master disc. A system for making a track in this manner is shown in FIGURE 2.

Here, a master disc 12 is mounted on the shaft 4, rotated through gear box 5 by constant speed motor 6. A recording and reproducing head 14 is placed to act on disc 12, as is also an erasing head 15.

Recording and reproducing head 14 is energized as a recorder by recording amplifier 16 receiving signals, for example, from oscillator 17 which is adjusted by knob 19 to oscillate at a frequency which will, for example, record 10,000 cycles on the complete track traversed by the recording head 14 in one revolution of disc 12. It is thus noted that oscillator 17 should be synchronized with the same power that drives motor 6. A cycle counter 20 is placed between oscillator 17 and recording amplifier 16 and is set to pass exactly ten thousand cycles and then block and shut off oscillator 17. Head 14 is then used as a reproducing head, and is connected by a two-way switch 21 to a reproducing amplifier 22 fed through a second cycle counter 24 to an oscilloscope control 25, energizing an oscilloscope 26. Second cycle counter 24 is set to place cycles numbers 1 and 10,000 on the screen of oscilloscope 26 so that incomplete closure or overlap can be seen. If not correct, the track is erased by use of erasing head 15. Erasing head 15 is connected to an ultra audio oscillator (not shown) through a hand controlled switch. It is turned on momentarily whenever it is decided to clear the disc 12. The oscillator 17 is then raised or lowered in frequency as the case may be, and a new recording is made, with subsequent closure examination. With careful frequency adjustment of oscillator 17 an accurate closure is readily obtained after a few trials. As before, once a closed track has been accomplished, the master disc 12 can be utilized to record as many others as may be desired.

Although the embodiment of the invention as illustrated and described herein shows apparatus for measuring an angle and thus utilizes a rotary track, it should be understood that an endless linear track with appropriately positioned pickups could be used to accurately measure linear distances.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claim.

What is claimed is:

Means for producing an endless accurately closed reference signal periodic wave track containing an exact predetermined number in the thousands of closely spaced cycles, comprising: a rotatable master gear with a predetermined number of relatively few accurately cut identical teeth thereon, said teeth being of magnetic material and being accurately evenly spaced, a rotatable record member having an endless uninterrupted magnetizable surface thereon, shaft means securely connecting said record member relative to said master gear, substantially constant speed driving means connected to said shaft means for effecting rotation of said gear and said member in unison, a magnetic pickup positioned in operative relation with said teeth to have generated in said pickup a signal of a frequency determined by gear speed and number of teeth, frequency multiplying means connected to said pickup, and recording means connected to said frequency multiplying means and positioned in recording relation with said magnetizable surface to record the multiplied frequency signal on said record member, the recorded signal forming said accurately closed reference signal track.

References Cited in the file of this patent

UNITED STATES PATENTS

| | | |
|---|---|---|
| 1,665,331 | Thomson | Apr. 10, 1928 |
| 2,475,742 | Hammond | July 12, 1944 |
| 2,585,291 | Wittel | Feb. 12, 1952 |
| 2,609,143 | Stibitz | Sept. 2, 1952 |
| 2,611,813 | Sharpless et al. | Sept. 23, 1952 |